(12) United States Patent
Sugiura

(10) Patent No.: US 9,467,655 B2
(45) Date of Patent: Oct. 11, 2016

(54) COMPUTER READABLE RECORDING MEDIUM, COMMUNICATION TERMINAL DEVICE AND TELECONFERENCING METHOD

(71) Applicant: Brother Kogyo Kabushiki Kaisha, Nagoya-shi, Aichi-ken (JP)

(72) Inventor: Masatoshi Sugiura, Kariya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/555,768

(22) Filed: Nov. 28, 2014

(65) Prior Publication Data

US 2015/0156459 A1 Jun. 4, 2015

(30) Foreign Application Priority Data

Nov. 29, 2013 (JP) ................................ 2013-247158

(51) Int. Cl.
| | |
|---|---|
| *H04N 7/15* | (2006.01) |
| *H04N 7/14* | (2006.01) |
| *H04N 19/44* | (2014.01) |
| *H04N 19/503* | (2014.01) |
| *H04N 19/593* | (2014.01) |

(52) U.S. Cl.
CPC .............. *H04N 7/152* (2013.01); *H04N 7/147* (2013.01); *H04N 19/44* (2014.11); *H04N 19/503* (2014.11); *H04N 19/593* (2014.11)

(58) Field of Classification Search
CPC ........ H04N 7/15; H04N 7/152; H04N 7/155; H04N 7/157; H04N 19/44; H04N 19/503; H04N 19/593; H04N 7/147

USPC ............................................ 348/14.08, 14.09
See application file for complete search history.

(56) References Cited

U.S. PATENT DOCUMENTS

| 7,561,602 B1 | 7/2009 | Nakabayashi | |
|---|---|---|---|
| 8,254,455 B2* | 8/2012 | Wu ...................... | H04N 19/176 375/240.16 |
| 2009/0220012 A1* | 9/2009 | Rodriguez ............... | H04N 5/76 375/240.25 |
| 2013/0265381 A1* | 10/2013 | Al ....................... | H04L 65/4038 348/14.08 |

FOREIGN PATENT DOCUMENTS

| JP | 2001-045065 A | 2/2001 |
|---|---|---|
| JP | 2001-128132 A | 5/2001 |
| JP | 2007-082045 A | 3/2007 |

* cited by examiner

*Primary Examiner* — Stella L Woo
(74) *Attorney, Agent, or Firm* — Banner & Witcoff, Ltd.

(57) ABSTRACT

When a number of unprocessed compressed images stored in a storage area is smaller than a threshold, the compressed image acquired from the storage area is decoded. When the number of unprocessed compressed images stored in the storage area is greater than the threshold, and when an image type of the compressed image is a predetermined type, the compressed image acquired from the storage area is decoded. When the number of unprocessed compressed images stored in the storage area is greater than the threshold, and when an image type of the compressed image is not the predetermined type, the compressed image acquired from the storage area is not decoded.

17 Claims, 9 Drawing Sheets

COMPUTER READABLE RECORDING MEDIUM, COMMUNICATION TERMINAL DEVICE AND TELECONFERENCING METHOD

CROSS REFERENCE TO RELATED APPLICATION

This application is based upon and claims the benefit of priority of Japanese Patent Application No. 2013-247158 filed on Nov. 29, 2013, the contents of which are incorporated herein by reference in its entirety.

BACKGROUND

The present disclosure relates to a computer-executable recording medium storing a program, a communication terminal device, and a teleconferencing method, which control a communication terminal device used in a teleconference through a network.

Technologies related to teleconferencing have been proposed recently. For example, a video conference system and the like is known. In the video conference system, a use band is defined between a terminal and an MCU. The MCU delivers a video stream without being thinned out to a terminal of a speaker or a user that is requested by the terminal, and delivers a video stream which is thinned out to other terminals.

SUMMARY

In the teleconference, in addition to a communication terminal device such as a personal computer, a mobile type communication terminal device such as a smart phone or a tablet terminal may be used. The mobile-type communication terminal device has lower processing capability compared with the personal computer in many cases. In addition, the mobile-type communication terminal devices have different processing capability depending on models.

In the teleconference performed by a communication terminal device and a counter party device as a counter party, which are connected through a network, when the processing capability of the communication terminal device is low, there may be a delay in decoding video data transmitted from the counter party device. As a result a captured image included in the decoded video data to be displayed may seem to stop. For example, in a teleconference (a Web conference and the like not using the MCU, the communication terminal device separately receives respective pieces of video data from a plurality of counter party devices. Accordingly, for example, with an increase in the counter party devices, the volume of video data required for decoding increases, and thus there is a possibility of delay in decoding. In addition, the MCU is a server device having functions of generating one piece of video data by combining respective pieces of video data transmitted from all of the communication terminal devices and the counter party devices which participate in a teleconference, and transmitting the combined video data to all communication devices described above. Further, even when the processing capability of the communication terminal device is high, if the frame rate of the video data is reduced uniformly without considering the processing capability of the communication terminal device, the captured video is displayed frame by frame.

An object of aspects of the present disclosure is to provide a program, a communication terminal device and a teleconferencing method, in which the communication terminal device is capable of smoothly performing a displaying process based on video data depending on the processing capability of the communication terminal device.

An aspect of the present disclosure provides the following arrangements:

A non-transitory computer readable recording medium storing a computer-executable program, when executed by a computer of a communication terminal device used in a teleconference through a network, causing the communication terminal device to execute:

an acquiring instruction of acquiring, through a communication unit of the communication terminal connected to the network, video data including a compressed image from counter party devices including a first counter party device and a second counter party device, the first counter party device and second counter party device being counter partied of the teleconference;

a storage control instruction of sequentially storing the compressed image included in the acquired video data in a storage area according to an order in which the compressed images have been acquired;

a first determination instruction of determining whether a number of unprocessed compressed images is greater than a threshold, the unprocessed compressed images being the compressed images which are stored in the storage area and have not been subjected to a decoding process;

a second determination instruction of second determining whether an image type of the compressed image is a predetermined type; and a decoding control instruction of:
  decoding the compressed image when the first determination instruction determines that the number of the unprocessed compressed images is not greater than the threshold and when the second determination instruction determines that the image type of the compressed image is the predetermined type; and
  not decoding the compressed image when the first determination instruction determines that the number of the unprocessed compressed images is greater than the threshold and when the second determination instruction determines that the image type of the compressed image is not the predetermined type.

A communication terminal device used in a teleconference through a network, comprising:

a processor; and memory storing computer readable instructions, when executed by the processor, causing the communication terminal device to execute:

an acquiring instruction of acquiring, through a communication unit of the communication terminal connected to the network, video data including a compressed image from counter party devices including a first counter party device and a second counter party device, the first counter party device and the second counter party being counter parties of the teleconference;

a storage control instruction of sequentially storing the compressed image included in the acquired video data in a storage area according to an order in which the compressed images have been acquired;

a first determination instruction of determining whether a number of unprocessed compressed images is greater than a threshold, the unprocessed compressed images being the compressed images which are stored in the storage area and have not been subjected to a decoding process;

a second determination instruction of second determining whether an image type of the compressed image is a predetermined type; and a decoding control instruction of:
  decoding the compressed image when the first determination instruction determines that the number of the unprocessed compressed images is not greater than the threshold and when the second determination instruction determines that the image type of the compressed image is the predetermined type; and
  not decoding the compressed image when the first determination instruction determines that the number of the unprocessed compressed images is greater than the threshold and when the second determination instruction determines that the image type of the compressed image is not the predetermined type.

A teleconferencing method of controlling a communication terminal device used in a teleconference through a network, the teleconferencing method comprising:
  an acquiring instruction of acquiring, through a communication unit of the communication terminal connected to the network, video data including a compressed image from counter party devices including a first counter party device and second counter party device, the first counter party device and the second counter party device being counter parties of the teleconference;
  a storage control instruction of sequentially storing the compressed image included in the acquired video data in a storage area according to an order in which the compressed images have been acquired;
  a first determination instruction of determining whether a number of unprocessed compressed images is greater than a threshold, the unprocessed compressed images being the compressed images which are stored in the storage area and have not been subjected to a decoding process;
  a second determination instruction of second determining whether an image type of the compressed image is a predetermined type; and
  a decoding control instruction of:
    decoding the compressed image when the first determination instruction determines that the number of the unprocessed compressed images is not greater than the threshold and when the second determination instruction determines that the image type of the compressed image is the predetermined type; and
    not decoding the compressed image when the first determination instruction determines that the number of the unprocessed compressed images is greater than the threshold and when the second determination instruction determines that the image type of the compressed image is not the predetermined type.

DESCRIPTION OF ILLUSTRATIVE EMBODIMENTS

Illustrative embodiments according to the present disclosure will be described with reference to drawings. The present invention is not limited to the following configuration, and it is possible to adopt various configurations in the same technical spirit. For example, some of configurations shown below may be omitted or replaced with other configurations, or may include other configurations.

Teleconference System

Figure 1:
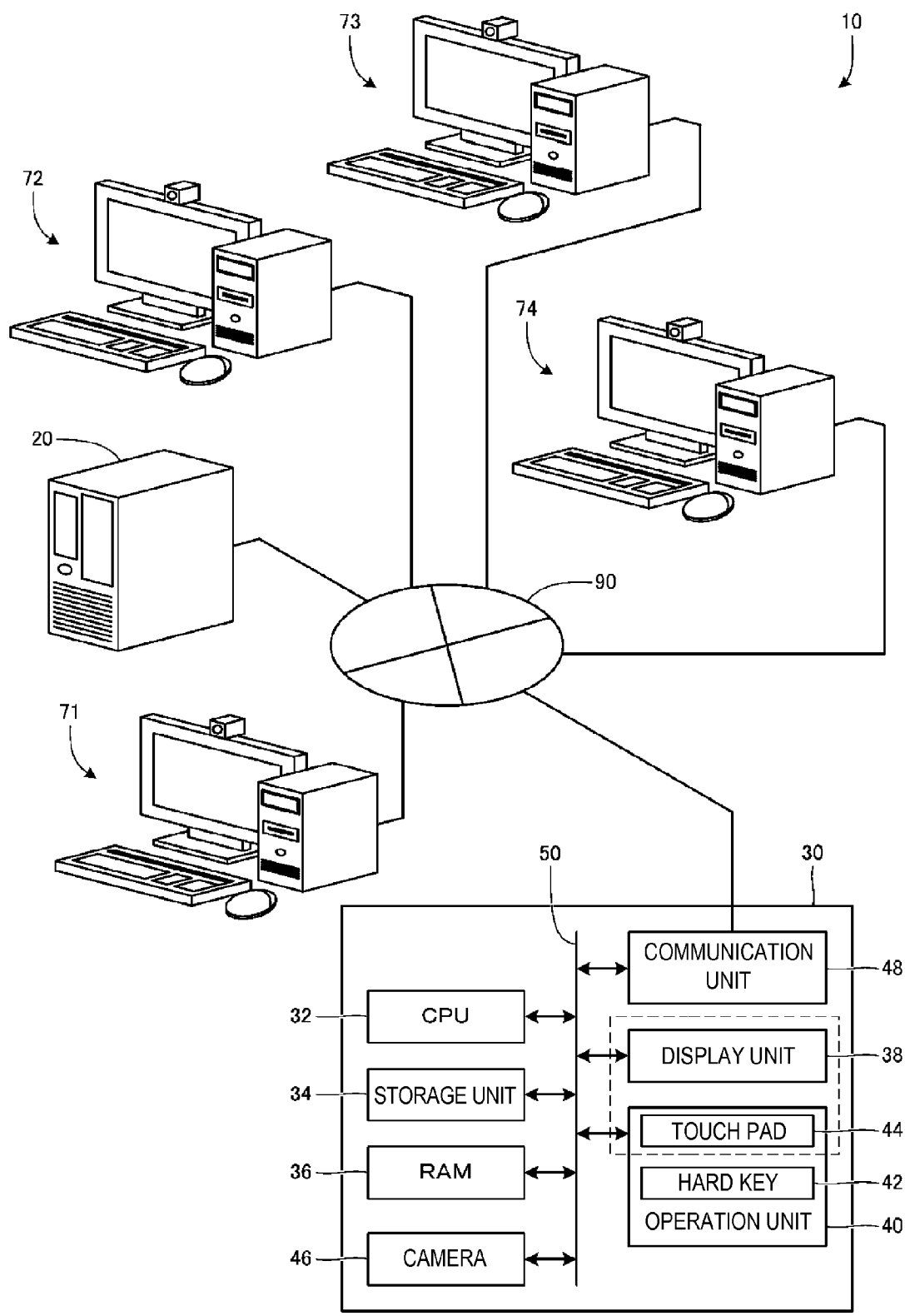
FIG. 1 is a diagram illustrating an example of a teleconference system.
Figure 2:
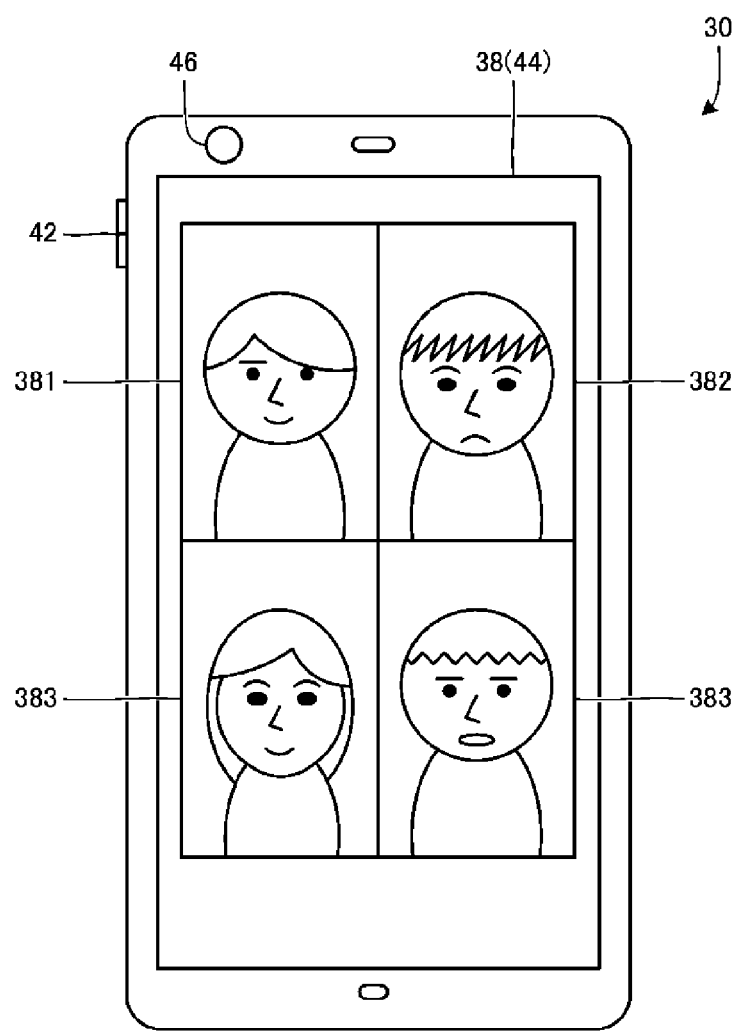
FIG. 2 is a diagram illustrating an example of a teleconference screen displayed on a communication terminal device.

A teleconference system 10 will be described briefly with reference to FIGS. 1 and 2. As illustrated in FIG. 1, the teleconference system 10 includes a server device 20, a communication terminal device 30, and four counter party devices 71, 72, 73, and 74. A teleconference which is performed by the communication terminal device 30 and four counter party devices 71, 72, 73, and 74 will be described as an example below. The teleconference using the teleconference system 10 may be performed by the communication terminal device 30 and one to three counter party devices, or the communication terminal device 30 and five or more counter party devices.

The server device 20, the communication terminal device 30, and the counter party devices 71, 72, 73, and 74 are connected through a network 90. The network 90 is, for example, a network such as the Internet. The teleconference using the communication terminal device 30 and the counter party devices 71, 72, 73, and 74 is performed through the server device 20, similarly to a known teleconference system. The server device 20 is the same server device as a server device in the known teleconference system. Accordingly, a detailed description of the hardware configuration of the server device 20 and the processes executed in the server device 20 are omitted. The teleconference using the teleconference system 10 may be performed in such a manner that the communication terminal device 30 and the counter party devices 71, 72, 73, and 74 directly communicate through the network 90. In such a P2P type teleconference, the server device 20 is omitted.

The communication terminal device 30 is a communication device having a communication function through the network 90. The communication terminal device 30 is, for example, a communication device such as a smart phone, a tablet terminal or a personal computer. A case in which the communication terminal device 30 is a mobile type communication device such as a smart phone and a tablet terminal will be described as an example below. The configuration of the communication terminal device 30 will be described later. The counter party devices 71, 72, 73, and 74 are known communication devices such as personal computers. Some or all of the counter party devices 71, 72, 73, and 74 may be the same communication device as the communication terminal device 30. During the teleconference, respective processes (see FIGS. 4 to 9) performed in the communication terminal device 30 are also performed in the counter party devices 71, 72, 73, and 74. The name of "counter party device" is given simply in order to distinguish the communication terminal device 30, in an embodiment in which the communication terminal device 30 is mainly described. The description regarding the counter party devices 71, 72, 73, and 74 will be appropriately omitted.

In the teleconference system 10, video data corresponding to an image captured by the communication terminal device 30 is transmitted from the communication terminal device 30 to the server device 20. Further, video data corresponding to an image captured by the counter party device 71 is transmitted from the counter party device 71 to the server device 20. Even in the counter party devices 72, 73, 74, similarly to the counter party device 71, respective pieces of video data corresponding to respective captured images are transmitted to the server device 20. The server device 20 which has acquired the video data from the communication terminal device 30 and the counter party devices 71, 72, 73, and 74 transmits the acquired video data and sound data respectively to the communication terminal device 30 and the counter party devices 71, 72, 73, and 74 other than a transmission source device. For example, the server device 20 transmits the video data which has been transmitted from the communication terminal device 30, respectively to the counter party devices 71, 72, 73, and 74 other than the communication terminal device 30. In other words, in the teleconference system 10, the video data which has been transmitted from the communication terminal device 30 is transmitted respectively to the counter party devices 71, 72, 73, 74 through the server device 20 in a streaming manner, and the video data which has been transmitted from the counter party devices 71, 72, 73, 74 is respectively transmitted to the communication terminal device 30 through the server device 20 in a streaming manner.

Video data is compressed by a predetermined compression method. For example, H.264 is illustrated as the compression method. The video data includes an intra-frame compressed image and an inter-frame compressed image similarly to known video data. The frame rate of the video data is, for example, 30 fps. The example of the intra-frame compressed image is an intra-coded frame (I frame), and an example of the inter-frame compressed image is a predicted frame (P frame) and a bi-directional predicted frame (B frame). The I frame is an image which is coded without using inter-frame prediction. The P frame is an image which is coded by using only forward prediction. The B frame is an image which is coded by using any of forward prediction, backward prediction, and bi-directional prediction. The I frame, the P frame, and the B frame are compressed images that have already been put to practical use. Therefore, the description thereof will be omitted. The I frame, the P frame, and the B frame are referred to as "compressed image" without distinction or collectively.

Identification information of the transmission source device in addition to the video data is transmitted from the communication terminal device 30 and the counter party devices 71, 72, 73, and 74. The server device 20 transmits the video data to the communication device other than the transmission source device with the identification information of the transmission source device. The identification information may be included in, for example, the header portions of the video data. The identification information is information for identifying each communication device.

The communication terminal device 30 receives and acquires the video data and the identification information from the counter party devices 71, 72, 73, and 74. In the communication terminal device 30, respective pieces of video data transmitted from the counter party devices 71, 72, 73, and 74 are played, and a teleconference screen in which captured images 381, 382, 383, and 384 corresponding to respective pieces of video data are arranged is displayed (see FIG. 2). The playback of video data is performed by decoding the compressed image that is included in the video data. The description regarding the playback by decoding will be given later.

The captured image 381 is a captured image corresponding to the video data from the counter party device 71. The captured image 382 is a captured image corresponding to the video data from the counter party device 72. The captured image 383 is a captured image corresponding to the video data from the counter party device 73. The captured image 384 is a captured image corresponding to the video data from the counter party device 74.

Also in the counter party devices 71, 72, 73, and 74, respective pieces of video data from the communication devices other than the devices themselves among the communication terminal device 30 and the counter party devices 71, 72, 73, and 74 are played, and a teleconference screen is displayed in which captured images corresponding to respective pieces of video data are appropriately arranged. The communication terminal device 30 may play video data acquired by the device itself so as to allow the captured image corresponding to the video data of the device itself to be displayed with the captured images 381, 382, 383, and 384. In this case, differently from FIG. 2, a teleconference screen is displayed in which a total of five images including the captured image of the device itself in addition to the captured images 381, 382, 383, and 384 are appropriately arranged. Further, the server device 20 may also transmit the video data that has been transmitted from the transmission source device to the transmission source device so as to allow for the transmission source device of the video data to perform the display of the captured image of the device itself, based on the respective pieces of video data which are transmitted from the server device 20 and received by the device itself. In this case, for example, the display of the captured image of the communication terminal device 30 itself is performed by playing the video data of the device itself that is transmitted from the server device 20. The communication terminal device 30 can set display or non-display for each captured image. For example, when the captured image of the communication terminal device 30 is set to non-display, the teleconference screen not including the captured image is displayed (see FIG. 2). The communication terminal device 30 displays the teleconference screen according to the setting of display or non-display of each captured image. The same setting is applied to the counter party devices 71, 72, 73, and 74.

Communication Terminal Device

As illustrated in FIG. 1, the communication terminal device 30 includes a CPU 32, a storage unit 34, a RAM 36, a display unit 38, an operation unit 40, a camera 46, and a communication unit 48. The respective units 32 to 48 are connected to a bus 50. The CPU 32 executes a calculation process. The storage unit 34 is configured with a computer-readable recording medium, for example, a flash memory. However, the storage unit 34 may be configured with a hard disc and/or a ROM. Various programs are stored in the storage unit 34. For example, an operating system (OS) and various applications are stored in the storage unit 34. The application stored in the storage unit 34 includes a program for executing each process which will be described later (see FIGS. 4 to 9). The program for executing each process which will be described later may be installed in advance in the storage unit 34, but when the communication terminal device 30 accesses the server device 20 in order to attend the teleconference, the program may be transmitted as a transmission signal to the communication terminal device 30 from the server device 20 through the network 90, and installed in the storage unit 34 at that time. In this case, the program may be stored in the RAM 36.

Pre-installation is performed, for example, by a reading unit (not shown) of the communication terminal device 30 reading a program stored in the computer-readable storage medium such as a semiconductor memory. When the communication terminal device 30 includes, for example, an optical drive (not shown) as in a personal computer, the pre-installation may be performed by the optical drive reading the program stored in the optical media. In addition, the pre-installation may be performed by receiving a program stored in a computer-readable storage medium such as a hard disc of a server device (server device 20 or a server device which is not shown) connected to the communication terminal device 30 through the network 90 through the communication unit 48 of the communication terminal device 30 as a transmission signal. The selection of a pre-installation type is appropriately determined considering various circumstances. In addition, the computer-readable storage medium may not include signals which are transmitted temporarily. The computer-readable storage medium may be a non-transitory storage medium. The non-transitory storage medium does not include a temporary signal. The non-transitory storage medium may be a storage medium capable of storing information, regardless of the period for storing information.

The RAM 36 is a storage area to be used when the CPU 32 executes various programs. During the execution of the process, predetermined data and information which are used in the process are stored in a predetermined storage area of the RAM 36. For example, the compressed image included in the video data from the counter party device 71, the compressed image included in the video data from the counter party device 72, the compressed image included in the video data from the counter party device 73, and the compressed image included in the video data from the counter party device 74 are respectively stored temporarily in sequence in the RAM 36. The compressed image included in the video data from the counter party device 71 is stored in a queue 361 corresponding to the identification information of the counter party device 71 (see FIG. 3). The compressed image included in the video data from the counter party device 72 is stored in a queue 362 corresponding to the identification information of the counter party device 72 (see FIG. 3). The compressed image included in the video data from the counter party device 73 is stored in a queue 363 corresponding to the identification information of the counter party device 73 (see FIG. 3). The compressed image included in the video data from the counter party device 74 is stored in a queue 364 corresponding to the identification information of the counter party device 74 (see FIG. 3). The respective queues 361, 362, 363, and 364 are associated with a predetermined storage area in the RAM 36. The respective queues 361, 362, 363, and 364 may be associated with separate storage areas in the RAM 36, or may be associated with a common storage area. When the respective queues 361, 362, 363, and 364 are associated with a common storage area, the identification information of the transmission source device may be included in the compressed image.

Figure 3:
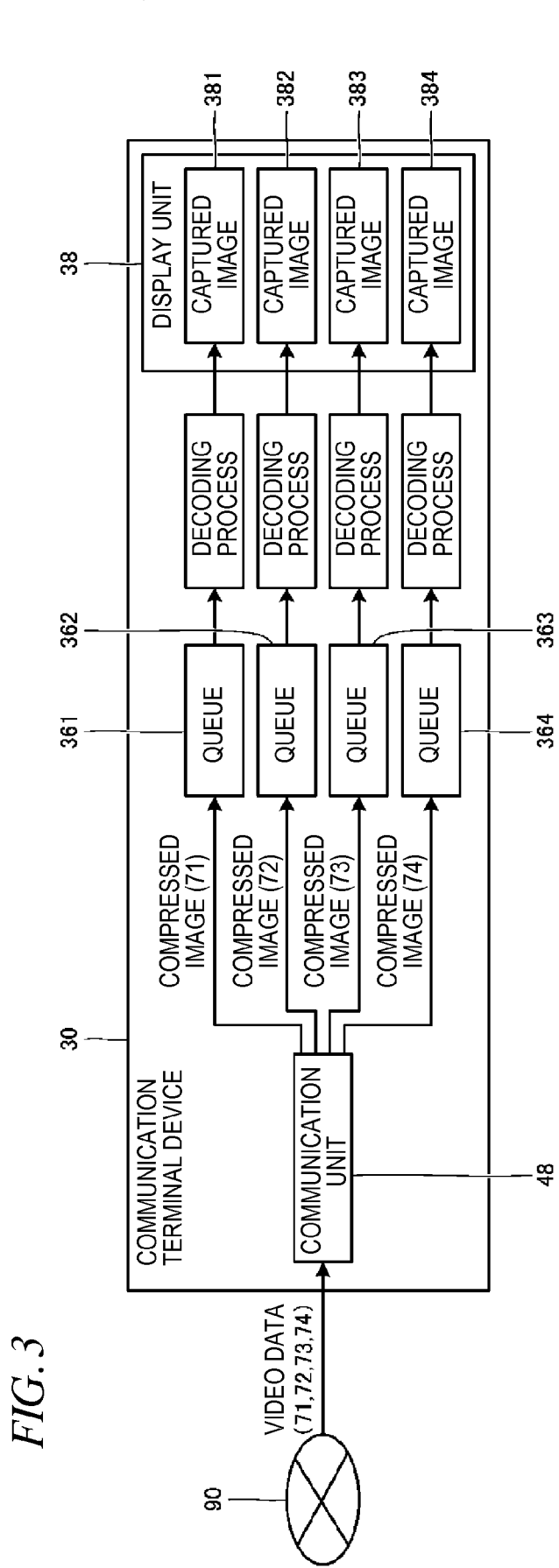
FIG. 3 is a functional block diagram illustrating procedures from receiving video data to displaying a captured image.
Figure 6:
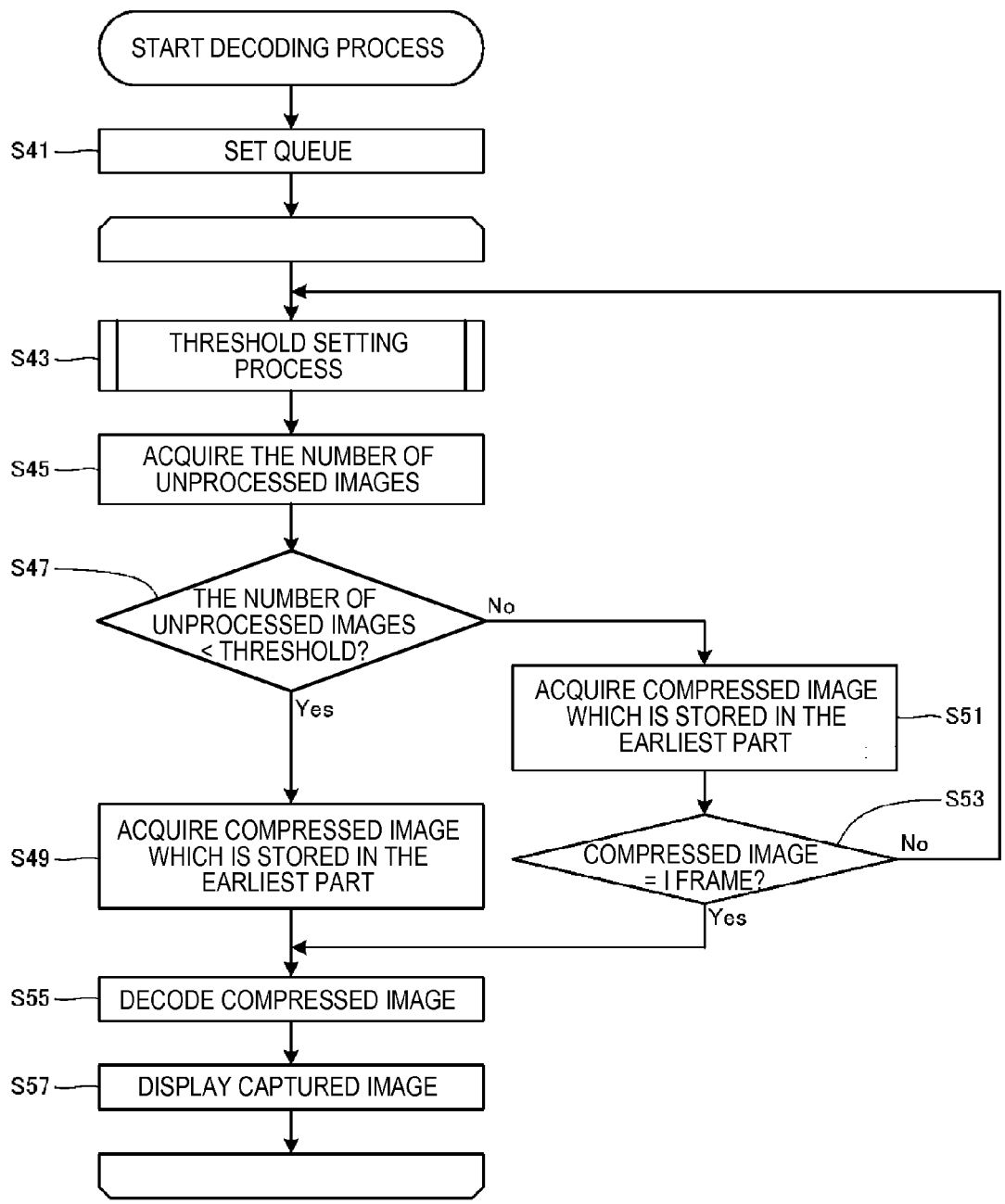
FIG. 6 is a flowchart of a decoding process.

The compressed images included in the respective pieces of video data from the counter party devices 71, 72, 73, and 74 which are respectively stored in the queue 361, 362, 363, and 364 are respectively output in the order in which they are input, and subjected to the decoding process (see FIGS. 3 and 6). In other words, the CPU 32 receives and acquires the compressed images, and sequentially stores the respective compressed images in the queue 361, 362, 363, and 364 according to an order in which the compressed images have been receive and acquired. In FIG. 3, the server device 20 and the counter party devices 71, 72, 73, and 74 are not illustrated, and respective predetermined units of the communication terminal device 30 are appropriately not displayed. In FIG. 3, "video data (71, 72, 73, and 74)" indicates respective pieces of video data from the counter party devices 71, 72, 73, and 74 which are transmitted through the server device 20. "Compressed image (71)" indicates a compressed image included in the "video data (71)" from the counter party device 71, "compressed image (72)" indicates a compressed image included in the "video data (72)" from the counter party device 72, "compressed image (73)" indicates a compressed image included in the "video data (73)" from the counter party device 73, and "compressed image (74)" indicates a compressed image included in the "video data (74)" from the counter party device 74. In the embodiment, the queue 361, 362, 363, and 364 are referred to as "queue" without distinction or collectively.

In the communication terminal device 30, the CPU 32 executes the OS stored in the storage unit 34 and programs of respective processes illustrated in FIGS. 4 to 9 so as to control the communication terminal device 30. Thus, in the communication terminal device 30, various processes are executed, and various types of functional means are realized.

The display unit 38 displays various types of information. For example, the display unit 38 displays the teleconference screen including the captured images 381, 382, 383, and 384 (see FIG. 2). The operation unit 40 receives input such as various instructions for the communication terminal device 30. The operation unit 40 includes, for example, a hard key 42 and a touch pad 44. The touch pad 44 is, for example, a capacitance type position input device, and outputs a signal indicating a coordinate position corresponding to a contact position of the user's finger. The touch pad 44 may be configured with position input devices of other types such as a resistive film type position input device or an ultrasonic type position input device. A touch panel (see a dashed line surrounding "the display unit 38" and "the touch pad 44" in FIG. 1) is realized with the display unit 38 and the touch pad 44.

The user of the communication terminal device 30 performs operations such as a swipe, flick, tap, drag, and pinch-in and pinch-out on the touch pad 44. The user of the communication terminal device 30 performs each operation described above by moving the finger in contact with the touch pad 44 in a predetermined direction. Each operation is a technology which is also adopted in known smart phones or tablet terminals, and is also adopted in the communication terminal device 30. The operation unit 40 may be configured by combining a keyboard and a mouse. In addition, when the communication terminal device 30 is a personal computer, the operation unit 40 includes a keyboard and a mouse.

The camera 46 captures an outside image in front of the communication terminal device 30. For example, when the user of the communication terminal device 30 is located in front of the communication terminal device 30, the camera 46 captures the outside image including the user. In the communication terminal device 30, the camera 46 starts shooting at the start of the teleconference, and the compressed image corresponding to the captured image is generated. The communication unit 48 connects the communication terminal device 30 to the network 90, and performs data communication through the network 90. For example, the video data including the compressed image which is generated at the start of the teleconference and the identification information of the communication terminal device 30 are transmitted to the counter party devices 71, 72, 73, and 74 from the communication unit 48 through the server device 20. In the communication unit 48, the video data which is transmitted from each of the counter party devices 71, 72, 73, and 74 through the server device 20, and the identification information of the transmission source device are received. As described above, the video data from each of the counter party devices 71, 72, 73, and 74 is stored temporarily in sequence in a predetermined storage area of the RAM 36 of each of the counter party devices 71, 72, 73, and 74, and stored for management in any of the queues 361, 362, 363, and 364 according to the received identification information. The connection to the network 90 by the communication unit 48 may be either a wireless connection or a wired connection. For example, when the communication terminal device 30 is a mobile-type communication device, the connection to the network 90 by the communication unit 48 is a wireless connection. The communication unit 48 is a communication module for performing wireless communication, for example, according to a known communication scheme such as a Wi-Fi standard, a 4G standard, and a 3G standard.

The communication terminal device 30 is different from the known mobile-type communication device in that the program of each process to be described later is stored in the storage unit 34. However, the communication terminal device 30 is the same communication device as the known mobile-type communication device in hardware. The communication terminal device 30 may include an audio unit including a microphone and a speaker in addition to the respective units described above. Further, the communication terminal device 30 may include a calendar function, a timer function, and the like.

Main Process

Figure 4:
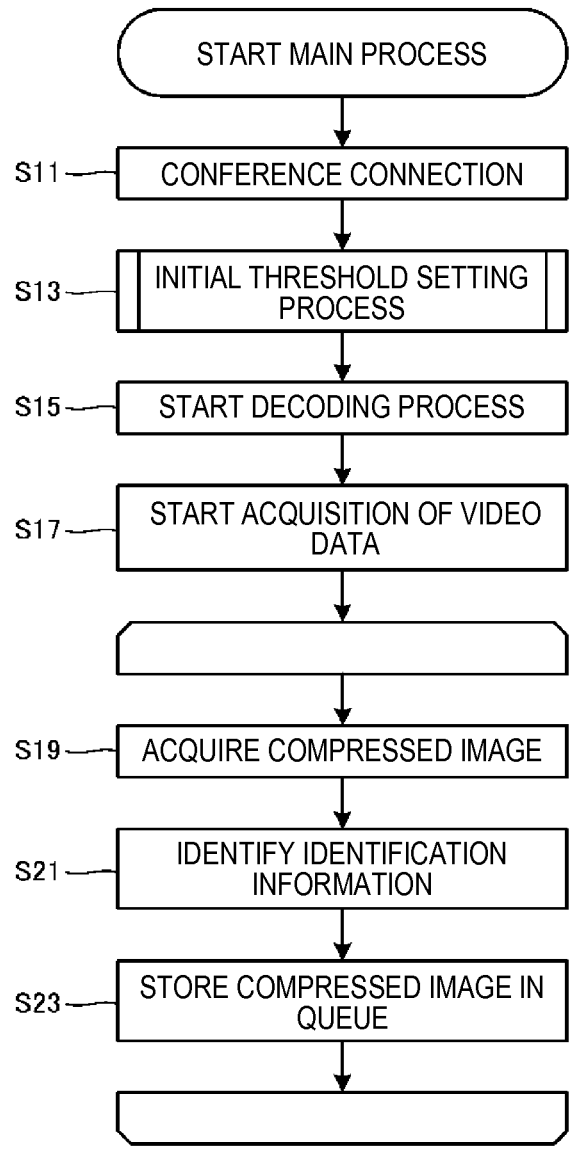
FIG. 4 is a flowchart of a main process.

In a teleconference with the counter party devices 71, 72, 73, and 74 through the server device 20, the main process performed by the communication terminal device 30 will be described with reference to FIG. 4. In the teleconference system 10, for example, before a scheduled date and time of the teleconference, an e-mail is transmitted from the server device 20, with each e-mail address corresponding to each of the communication terminal device 30 and the counter party devices 71, 72, 73, and 74 which are scheduled to attend the teleconference as a destination. The e-mail includes a uniform resource locator (URL) for the teleconference using the communication terminal device 30 and the counter party devices 71, 72, 73, and 74. The URL is specific for each conference room of the teleconference. In other words, the URL includes the conference ID of the teleconference.

Further, the URL includes authority information of the teleconference which is set for each of the communication terminal device 30 and the counter party devices 71, 72, 73, and 74. The authority which is set in the teleconference includes, for example, organizer authority, presenter authority and viewer authority, as the authority. The organizer authority is the highest authority, and can perform all the functions available in the teleconference system 10. The presenter authority is the next highest authority to the organizer authority, and is not allowed to execute some of the functions available in the teleconference system 10. The viewer authority is the lowest authority among the three illustrated authorities, and is not allowed to execute more functions than those in the presenter authority. In the embodiment, the organizer authority, the presenter authority and the viewer authority will be described as an example. Incidentally, the number of functions which can be executed according to the organizer authority is higher than the number of functions which can be executed according to the presenter authority. The number of functions which can be executed according to the presenter authority is higher than the number of functions which can be executed according to the viewer authority.

For example, it is assumed that the user who operates the counter party device 71 applies for the use of the teleconference, and at this time, an offer of setting is performed in which the communication terminal device 30 is set to the presenter authority, the counter party device 71 is set to the organizer authority, the counter party device 72 is set to the presenter authority, and the counter party devices 73, and 74 are set to the viewer authority. In this case, the URL transmitted to the communication terminal device 30 includes the authority information indicating the presenter authority in a predetermined portion of the URL. The URL transmitted to the counter party device 71 includes the authority information indicating the organizer authority in a predetermined portion of the URL. The URL transmitted to the counter party device 72 includes the authority information indicating the presenter authority in a predetermined portion of the URL. The URL transmitted to the counter party devices 73 and 74 includes the authority information indicating the viewer authority in a predetermined portion of the URL. In addition, the conference ID and the authority information may not be included as, for example, the query parameters of the URL.

The user of the communication terminal device 30 operates the communication terminal device 30 on the scheduled date and time of the teleconference. In the communication terminal device 30, the CPU 32 accesses the server device 20 from the communication unit 48 based on the URL including the conference ID and the authority information which are described above, and executes the process for conference connection (S11). By the process in S11, a session as a teleconference is established between the communication terminal device 30 and the server device 20, and the communication terminal device 30 is connected to the server device 20 for the conference. The same operation is performed also in the counter party devices 71, 72, 73, and 74, a session as a teleconference is established between each of the counter party devices 71, 72, 73, and 74 and the server device 20, and the counter party devices 71, 72, 73, and 74 are connected to the server device 20 for the conference.

The server device 20 stores the conference ID included in the URL in association with the identification information of each of the communication terminal device 30 and the counter party devices 71, 72, 73, and 74. At this time, while opening the teleconference, the server device 20 specifies authority that has been set in each communication device, according to the URL used by each of the communication terminal device 30 and the counter party devices 71, 72, 73, and 74 for access to the server device 20, and stores each specified authority in association with the identification information of each communication device. The teleconference by the communication terminal device 30 and the counter party devices 71, 72, 73, and 74 is opened in such a manner.

After performing S11, the CPU 32 starts an initial threshold setting process (S13). Subsequently, the CPU 32 starts a decoding process (S15). The decoding process started in S15 continues until, for example, the conference connection with the server device 20 is disconnected. The initial threshold setting process and the decoding process will be described later. Subsequently, the CPU 32 starts the acquisition of video data transmitted from the server device 20 (S17). In the teleconference identified by the conference ID, the server device 20 transmits the respective pieces of video data which have been acquired from some or all of the counter party devices 71, 72, 73, and 74 which are connected for the conference, to the communication terminal device 30. In the communication terminal device 30, the video data from some or all of the counter party devices 71, 72, 73, and 74 which has been transmitted from the server device 20 is received by the communication unit 48. The CPU 32 acquires the video data from the communication unit 48.

Next, the CPU 32 acquires compressed image included in the acquired video data (S19). The acquired compressed image is any of the I frame, the P frame and the B frame, as described above. At this time, the CPU 32 acquires and identifies the identification information of the transmission source device which is received by the communication unit 48 together with the video data, or which is included in the video data (S21). The CPU 32 stores the compressed image in a queue corresponding to the specified identification information (S23). The CPU 32 stores the compressed image acquired in S19 in a predetermined storage area of the RAM 36 associated with the queue. Thus, the acquired compressed image is stored in a predetermined storage area of the RAM 36 in a state of being associated with the identification information.

For example, it is assumed that the communication unit 48 receives the video data from the counter party device 71 and the identification information of the counter party device 71. In this case, the CPU 32 acquires the compressed image included in the video data from the counter party device 71 in S19, specifies the identification information of the counter party device 71 in S21, and stores the acquired compressed image in the queue 361 corresponding to the identification information of the counter party device 71 in S23. The CPU 32 stores the compressed image included in the video data from the counter party device 71 in a predetermined storage area of the RAM 36 corresponding to the queue 361. The queues 361, 362, 363, and 364 corresponding to the respective pieces of identification information of the counter party devices 71, 72, 73, and 74 are set in S41 of the decoding process started in S15 (see FIG. 6).

After the execution of S23, the CPU 32 returns the process to S19, and performs S19 and the subsequent processes. The main process is ended when the conference connection with the server device 20 is disconnected. At the end of the main process, the teleconference is ended.

Initial Threshold Setting Process

The initial threshold setting process which is executed in S13 of the main process illustrated in FIG. 4 will be described with reference to FIG. 5. The CPU 32 which has started the initial threshold setting process acquires the number of sites (S31). The number of sites corresponds to the number of the counter party devices that are connected to the server device 20 for the conference, by using the conference ID of the teleconference that the devices themselves attend, among counter party devices 71, 72, 73, and 74. The CPU 32 outputs a transmission instruction of a site number request for requesting the number of sites, to the communication unit 48. Accordingly, the site number request is transmitted from the communication unit 48 to the server device 20. The server device 20 which has received and acquired the site number request transmits the number of sites obtained by reducing "1" (corresponding to the communication terminal device 30 device itself as the request source) from the number of all communication devices that are connected for the conference to the teleconference identified by the conference ID at that time, to the communication terminal device 30 as the request source. The number of sites from the server device 20 is received by the communication unit 48, and the CPU 32 acquires the number of sites through the communication unit 48.

For example, a teleconference session is established with the counter party devices 71 and 72, and it is assumed that the counter party devices 71 and 72 are connected to the server device 20 for the conference. In this case, the CPU 32 acquires "2" as the number of sites. Further, a teleconference session is established with the counter party devices 71, 72, 73, and 74, and it is assumed that the counter party devices 71, 72, 73, and 74 are connected to the server device 20 for the conference. In this case, the CPU 32 acquires "4" as the number of sites. The CPU 32 stores the number of sites in the RAM 36.

Next, the CPU 32 determines whether or not the acquired number of sites is smaller than a reference number "5" which is a reference (S33). In S33, the reference number to be compared with the number of sites is stored in the storage unit 34 in association with, for example, the program of the initial threshold setting process. When the number of sites is smaller than "5" (S33: Yes), the CPU 32 sets the threshold as "3" (S35). When the number of sites is "5" or more (S33: No), the CPU 32 sets the threshold as "1" (S37). In the embodiment having four counter party devices 71, 72, 73, and 74 as an example, the maximum number of sites is "4", and thus S33 is positive (S33: Yes). If the number of communication devices that attend the teleconference is increased and is five or more, S33 is negative (S33: No). In addition, the reference number may be the number which is different from "5". For example, the reference number may be "3", "4", or "6" or more. The CPU 32 stores the threshold which is set in S35 or S37 in the RAM 36. After the execution of S35 or S37, the CPU 32 ends the initial threshold setting process, and returns the process to S15 in FIG. 4.

Decoding Process

The decoding process which is started in S15 of the main process illustrated in FIG. 4 will be described with reference to FIG. 6. The decoding process including the threshold setting process (see FIGS. 7 to 9) which will be described later is executed on respective pieces of video data from the counter party devices 71, 72, 73, and 74 (see FIG. 3). In other words, in the embodiment, four decoding processes are executed in parallel. In addition, at the timing of S11 of FIG. 4, a case is assumed in which all of the counter party devices 71, 72, 73, and 74 which are scheduled to attend the teleconference are not connected for the conference. In this case, at the timing at which the server device 20 notifies the counter party device which has not been connected among the counter party devices 71, 72, 73, and 74 of being connected to the server device 20 for conference connection, the CPU 32 starts the decoding process corresponding to the counter party device. For example, at the timing of S11 of FIG. 4, it is assumed that the counter party devices 71, 72, and 73 are connected with the server device 20 for the conference, but the counter party device 74 is not connected for the conference. In this case, the CPU 32 starts respective decoding processes on respective pieces of video data from the counter party devices 71, 72, and 73 at the timing S15. Thereafter, at the timing at which the counter party device 74 is connected to the server device 20 for the conference, the CPU 32 starts the decoding process on the video data from the counter party device 74, in response to the notification from the server device 20.

The CPU 32 which has started the decoding process sets a queue for each site which is the counter party for the teleconference (S41). For example, in the decoding process for the video data from the counter party device 71, a queue 361 corresponding to the identification information of the counter party device 71 is set. In the decoding process for the video data from the counter party device 72, a queue 362 corresponding to the identification information of the counter party device 72 is set. In the decoding process for the video data from the counter party device 73, a queue 363 corresponding to the identification information of the counter party device 73 is set. In the decoding process for the video data from the counter party device 74, a queue 364 corresponding to the identification information of the counter party device 74 is set.

After the execution of S41, the CPU 32 executes the threshold setting process (S43). The threshold setting process will be described later. Subsequently, the CPU 32 acquires the number of compressed images which are stored in the queue and are not decoded (the number of unprocessed images) (S45). The compressed image is stored in the queue in S23 of FIG. 4 described above. The CPU 32 compares the acquired number of unprocessed images with a threshold, and determines whether or not the number of unprocessed images is smaller than the threshold (S47). The threshold is stored in the RAM 36 in S35 or S37 of FIG. 5 described above. Further, the threshold is stored in the RAM 36 in S67 or S71 (see FIG. 7), in S85, S89 or S91 (see FIG. 8), or in S105 or S107 (see FIG. 9) of the threshold setting process executed in S43.

When the decoding process is executed on the video data from the counter party device 71, the CPU 32 acquires the number of unprocessed images of the queue 361 in S45 and compares the acquired number of unprocessed images with the threshold in S47. When the decoding process is executed on the video data from the counter party device 72, the CPU 32 acquires the number of unprocessed images of the queue 362 in S45 and compares the acquired number of unprocessed images with the threshold in S47. When the decoding process is executed on the video data from the counter party device 73, the CPU 32 acquires the number of unprocessed images of the queue 363 in S45 and compares the acquired number of unprocessed images with the threshold in S47. When the decoding process is executed on the video data from the counter party device 74, the CPU 32 acquires the number of unprocessed images of the queue 364 in S45 and compares the acquired number of unprocessed images with the threshold in S47.

When the number of unprocessed images is smaller than the threshold (S47: Yes), the CPU 32 acquires a compressed image which is stored in the earliest part, among the compressed images which are stored in the queue, from the storage area of the RAM 36 corresponding to the queue (S49). Thereafter, the CPU 32 moves the process to S55. When the number of unprocessed images is the threshold or more (S47: No), the CPU 32 acquires a compressed image which is stored in the earliest part, among the compressed images which are stored in the queue, from the storage area of the RAM 36 corresponding to the queue (S51). The CPU 32 determines whether or not the acquired compressed image is the I frame (S53). When the compressed image is the I frame (S53: Yes), the CPU 32 moves the process to S55. When the compressed image is the P frame or the B frame, and is not the I frame (S53: No), the CPU 32 returns the process to S43, and performs S43 and the subsequent processes. In this case, the process of S55 is omitted from the P frame or the B frame which is acquired in S51. Along with the execution of S49 or S51, the CPU 32 deletes the compressed image which is acquired in each process from the queue.

In S55, the CPU 32 decodes the I frame, the P frame, or the B frame which is acquired in S49, or the I frame which is acquired in S51. Subsequently, the CPU 32 controls the display of the captured image which is generated by decoding (S57). In S57, the CPU 32 outputs the display instruction of the generated captured image to the display unit 38. In the display unit 38, the captured image is displayed in response to the display instruction (see FIG. 2). For example, when the decoding process is executed on the video data from the counter party device 71, the captured image 381 is displayed. The CPU 32 deletes the compressed image corresponding to the captured image which is displayed from the RAM 36. After executing S57, the CPU 32 returns the process to S43, and performs S43 and the subsequent processes. The decoding process continues until the main process ends. In addition, when the conference connection between any communication device of the counter party devices 71, 72, 73, and 74 and the server device 20 is disconnected, this is notified from the server device 20, and the CPU 32 ends the decoding process on the video data from the counter party device of which the conference connection is disconnected, among the counter party devices 71, 72, 73, and 74.

Threshold Setting Process

With respect to the threshold setting process which is executed in S43 of the decoding process illustrated in FIG. 6, three examples will be described.

Example 1

Figure 7:
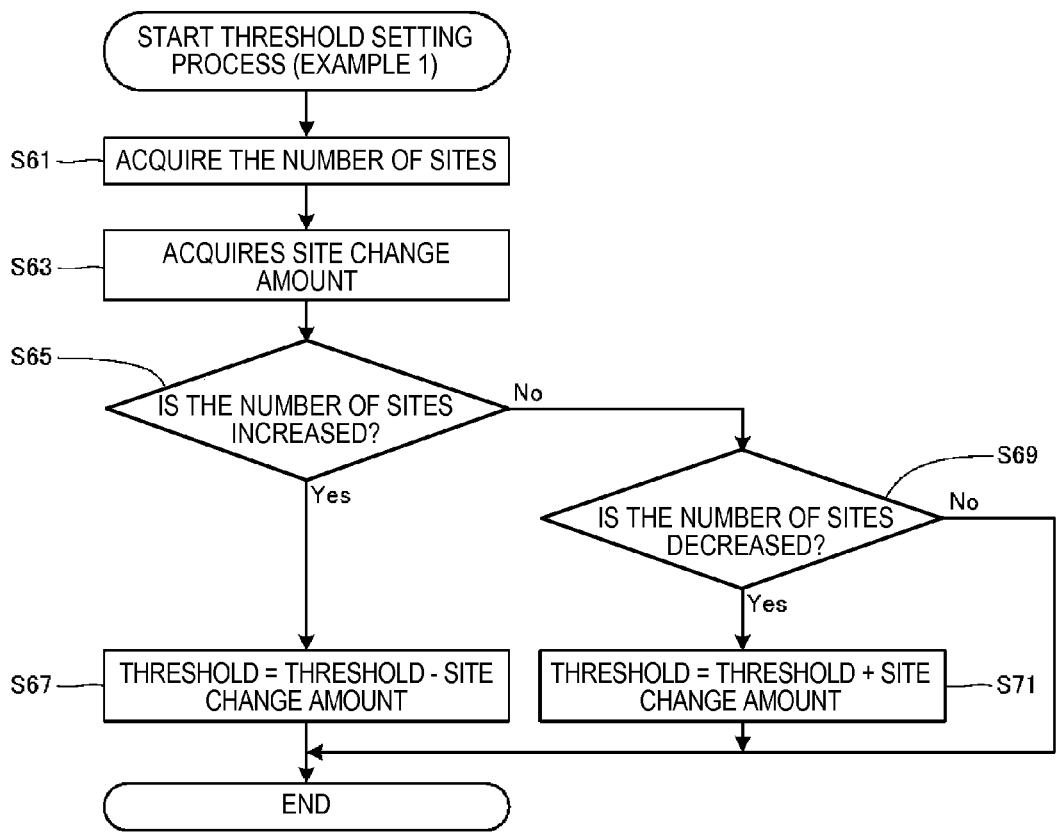
FIG. 7 is a flowchart of a threshold setting process of Example 1.

The threshold setting process of Example 1 will be described with reference to FIG. 7. The CPU 32 that has started the threshold setting process of the Example 1 re-acquires the number of sites (S61). The re-acquisition of the number of sites is performed similarly to S31 of FIG. 5. Accordingly, the description thereof is omitted. Subsequently, the CPU 32 acquires a site change amount (S63). The site change amount is a difference between the number of sites which has already been stored in the RAM 36 and the number of sites which is re-acquired in S61. In Example 1, a value obtained by subtracting the number of sites which has already been stored in the RAM 36 from the number of sites which is re-acquired in S61 is described as the site change amount.

Next, CPU 32 determines whether or not the number of sites increases, based on the acquired site change amount (S65). When the site change amount acquired in S63 is a value E, the CPU 32 determines that the number of sites increases (S65: Yes). The CPU 32 acquires a new threshold by subtracting the site change amount from the threshold stored in the RAM 36 (S67). The CPU 32 updates the threshold which has already been stored in the RAM 36 into the new threshold acquired in S67. After the execution of S67, the CPU 32 ends the threshold setting process of Example 1, and returns the process to S45 of FIG. 6.

When the site change amount acquired in S63 is "0" or a negative value, the CPU 32 determines that the number of sites does not increase (S65: No). Subsequently, the CPU 32 determines whether or not the number of sites decreases (S69). When the site change amount acquired in S63 is a negative value, the CPU 32 determines that the number of sites decreases (S69: Yes). The CPU 32 acquires a new threshold obtained by adding the absolute value of the site change amount to the threshold stored in the RAM 36 (S71). The CPU 32 updates the threshold which has already been stored in the RAM 36 into the new threshold acquired in S71. After the execution of S71, the CPU 32 ends the threshold setting process of Example 1, and returns the process to S45 of FIG. 6.

When the site change amount acquired in S63 is "0", the CPU 32 determines that the number of sites does not decrease (S69: No). In this case, the CPU 32 ends the threshold setting process of Example 1, and returns the process to S45 of FIG. 6, without executing S71. In addition, when S65 is positive (S65: Yes) or S69 is positive (S69: Yes), the CPU 32 updates the number of sites stored in the RAM 36 to the number of sites acquired in S61.

Example 2

Figure 8:
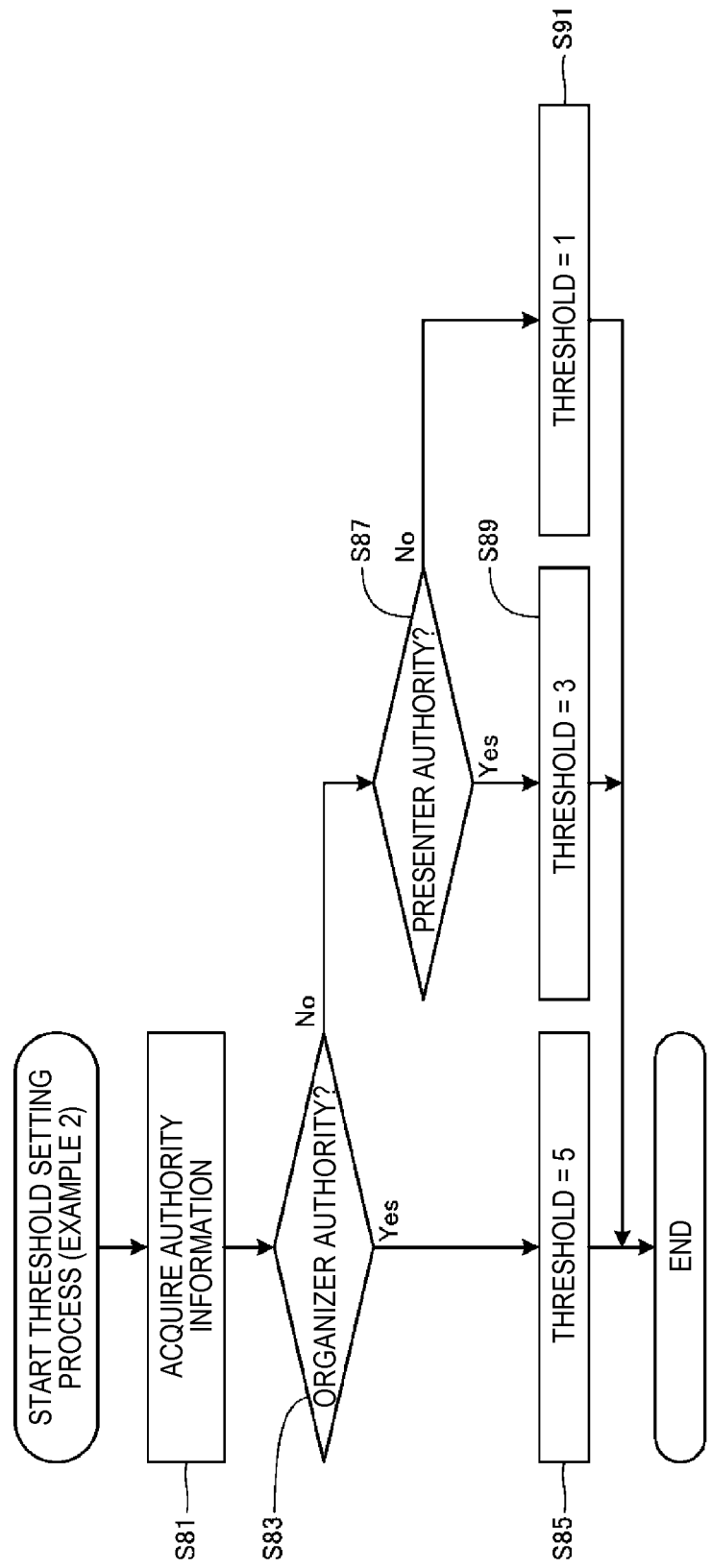
FIG. 8 is a flowchart of a threshold setting process of Example 2.

The threshold setting process of Example 2 will be described with reference to FIG. 8. The CPU 32 that has started the threshold setting process of the Example 2 re-acquires authority information (S81). The authority information to be acquired is authority which is set in the counter party device which is the transmission source of the video data to be subjected to the decoding process, among the counter party devices 71, 72, 73, and 74. In S81, the CPU 32 output a transmission instruction of an authority information request for requesting authority information, to the communication unit 48. According thereto, the authority information request is transmitted from the communication unit 48 to the server device 20. The authority information request includes the identification information of the counter party device which is the transmission source of the video data to be processed. The server device 20 which has received and acquired the authority information request transmits the authority information indicating the authority of the counter party device which is specified by the identification information, according to the identification information included in the authority information request, to the communication terminal device 30 of the transmission source. The authority information from the server device 20 is received by the communication unit 48, and the CPU 32 acquires the authority information through the communication unit 48.

It is assumed that the video data to be processed is the video data from the counter party device 71, and the authority of the counter party device 71 is the organizer authority. In this case, the CPU 32 causes the communication unit 48 to transmit an authority information request including the identification information of the counter party device 71, and acquires the authority information "organizer authority". It is assumed that the video data to be processed is the video data from the counter party device 72, and the authority of the counter party device 72 is the presenter authority. In this case, the CPU 32 causes the communication unit 48 to transmit an authority information request including the identification information of the counter party device 72, and acquires the authority information "presenter authority". It is assumed that the video data to be processed is the video data from the counter party device 73, and the authority of the counter party device 73 is the viewer authority. In this case, the CPU 32 causes the communication unit 48 to transmit an authority information request including the identification information of the counter party device 73, and acquires the authority information "viewer authority". It is assumed that the video data to be processed is the video data from the counter party device 74, and the authority of the counter party device 74 is the viewer authority. In this case, the CPU 32 causes the communication unit 48 to transmit an authority information request including the identification information of the counter party device 74, and acquires the authority information "viewer authority".

The acquired authority information may be stored in the RAM 36 in association with the identification information. According to the configuration, when S53 in FIG. 6 is negative (S53: No) or in the second and subsequent threshold setting processes which are executed repeatedly after the execution of S57, the CPU 32 can acquire the authority information associated with the identification information which is acquired with the video data to be processed from the RAM 36.

Next, the CPU 32 determines whether or not the acquired authority information is the organizer authority (S83). When the acquired authority information is the organizer authority (S83: Yes), the CPU 32 updates the threshold stored in the RAM 36 into "5" (S85). When the acquired authority information is the presenter authority or viewer authority, but is not the organizer authority (S83: No), the CPU 32 determines whether or not the acquired authority information is the presenter authority (S87). When the acquired authority information is the presenter authority (S87: Yes), the CPU 32 updates the threshold stored in the RAM 36 into "3" (S89). When the acquired authority information is the viewer authority, but is not the presenter authority (S87: No), the CPU 32 updates the threshold stored in the RAM 36 into "1" (S91).

After the execution of S85, S89 or S91, the CPU 32 ends the threshold setting process of Example 2, and returns the process to S45 of FIG. 6.

Example 3

The threshold setting process of Example 3 will be described with reference to FIG. 9. The CPU 32 that has started the threshold setting process of Example 3 acquires an image size (S101). The image size to be acquired is video data to be subjected to the decoding process. The respective pieces of video data from the counter party devices 71, 72, 73, and 74 do not necessarily have the same image size, but some or all thereof may have different image sizes. The image sizes of the respective pieces of video data are sizes corresponding to the specification or setting of the cameras respectively included in the counter party devices 71, 72, 73, and 74. The acquired image size may be stored in the RAM 36 in association with the identification information. According to the configuration, when S53 in FIG. 6 is negative (S53: No) or in the second and subsequent threshold setting processes which are executed repeatedly after the execution of S57, the CPU 32 can acquire the image size associated with the identification information acquired with the video data to be processed from the RAM 36.

Next, the CPU 32 determines whether or not the acquired image size is greater than VGA (horizontal×vertical: 640× 480 pixel) which is set as a reference (S103). When the acquired image size is greater than VGA (S103: Yes), the CPU 32 updates the threshold stored in the RAM 36 into "1" (S105). When the acquired image size is VGA or less (S103: No), the CPU 32 updates the threshold stored in the RAM 36 into "3" (S107).

After the execution of S105 or S107, the CPU 32 ends the threshold setting process of Example 3, and returns the process to S45 of FIG. 6.

Effect of Embodiments

According to the embodiments described above, it is possible to achieve the following effect.

(1) In the decoding process (see FIG. 6), when the number of the unprocessed compressed images stored in one queue among the queues 361, 362, 363, and 364 corresponding to the respective pieces of identification information of the counter party devices 71, 72, 73, and 74 is greater than the threshold (see S47: No in FIG. 6), the compressed image which is stored in the earliest part is acquired from the storage area of the RAM 36 corresponding to the queue (S51 in FIG. 6), when the acquired compressed image is the I frame (S53: Yes in FIG. 6), it is assumed that the I frame is decoded (see S55 in FIG. 6). In contrast, when the acquired compressed image is not the I frame (S53: No in FIG. 6), it is assumed that the decoding of the compressed image which is not the I frame, in other words, the P frame or the B frame, is omitted.

Therefore, with respect to the decoding of the compressed image included in respective pieces of video data from the counter party devices 71, 72, 73, and 74, it is possible to determine whether to decode the compressed image according to the number of unprocessed images. Since it is possible to decode the I frame independently, it is possible to make the processing load required for decoding lower as compared with that of the P frame and B frame. In contrast, since it is necessary to decode the P frame and the B frame based on the before and after compressed images, it is possible to reduce the processing load by omitting the decoding of the P frame and the B frame. When the number of unprocessed compressed images is smaller than the threshold, the decoding is performed smoothly, and it is estimated that the CPU 32 has enough processing capability. When the number of unprocessed compressed images is smaller than the threshold (see S47: Yes in FIG. 6), regardless of whether or not the compressed image is the I frame, the P frame or the B frame, the compressed image is uniformly decoded (see S49 and S55 in FIG. 6). It is possible for the communication terminal device 30 to smoothly perform the display process based on the video data, depending on the processing capability of the CPU 32 of the communication terminal device 30.

(2) In the initial threshold setting process (see FIG. 5), the number of sites is acquired (see S31 in FIG. 5), and it is assumed that the threshold to be compared with the number of unprocessed images is set according to the number of sites acquired in S47 of FIG. 6. When the number of sites is greater than the reference number "5" (see S33: No in FIG. 5), it is assumed that the threshold is set to "1" which is smaller as compared to the threshold "3" in the case in which the number of sites is smaller than the reference number "5" (see S35 and S37 in FIG. 5). The greater the number of counter party devices is, the greater the number of pieces of video data to be transmitted to the communication terminal device 30. As a result, the processing load required for decoding is increased. When the processing load is increased, the threshold is reduced, such that it is possible to reduce the number of executions of S55 in FIG. 6 regarding the decoding of the compressed image.

(3) In the decoding process (see FIG. 6), it is assumed that the threshold that has been set is updated by executing the threshold setting process (S43 in FIG. 6). In the threshold setting process (see FIG. 7) of Example 1, the number of sites is re-acquired (see S61 in FIG. 7), it is assumed to determine an increase or a decrease in the number of sites according to the site change amount indicating the difference from the number of sites which is stored in the RAM 36 (see S65 and S69 in FIG. 7). When the number of sites is increased (see S65: Yes in FIG. 7), it is assumed that the threshold is reduced so as to correspond to the site change amount (see S67 in FIG. 7), whereas when the number of sites is decreased (see S69: Yes in FIG. 7), it is assumed that the threshold is increased so as to correspond to the site change amount (see S71 in FIG. 7). Therefore, in the initial threshold setting process or the threshold setting process which is previously performed, it is possible to re-set the threshold which has been set according to the number of sites. For example, during the period before and after the start time of the teleconference, the session of teleconference is established now, and the number of sites which are connected for conference is gradually increased in some cases. In contrast, for example, when a predetermined time has elapsed after the start of the teleconference, or discussion has been progressed, participants leave from the teleconference, and thus the conference connection is disconnected, and the number of sites is gradually reduced in some cases. It is possible to correspond to such a change in the number of sites.

In the threshold setting process of Example 2 (see FIG. 8), authority information corresponding to the transmission source device of the video data is acquired (see S81 in FIG. 8), and the threshold is updated according to the authority information. Accordingly, it is possible to set individual thresholds for respective pieces of video data from the counter party devices 71, 72, 73, and 74. The threshold "5" is set (see S85 in FIG. 8) for the video data having the organizer authority which is the highest authority (see S83: Yes in FIG. 8), the threshold "3" is set (see S89 in FIG. 8) for the video data having the presenter authority which is the second highest (see S87: Yes in FIG. 8), and the threshold "1" is set for the video data having the viewer authority which is the lowest (see S87: No in FIG. 8). Since the threshold "5" which is higher than the threshold "3" or "1" of the video data having other authority is set to the video data having the organizer authority, it is possible to execute decoding of the compressed image without omission. As a result, it is possible to suppress a decrease in the reproduction quality and perform smooth display for the video data having the organizer authority. Meanwhile, as the authority is lower, the threshold is set to be low, and it is possible to make the omission of the decoding of compressed image easier. As a result, it is possible to reduce the processing load on the decoding.

In the threshold setting process (see FIG. 9) of Example 3, an image size of the video data is acquired (see S101 of FIG. 9), and the threshold is updated according to the image size. Therefore, it is possible to set individual thresholds for the video data from the counter party devices 71, 72, 73, and 74. It is possible to set the threshold as "1" (see S105 in FIG. 8) for the video data of which the image size is greater than the VGA (S103: Yes in FIG. 8), and set the threshold as "3" for the video data of which the image size is smaller than the VGA (S103: No in FIG. 8). It is possible to make the omission of the decoding of a compressed image easier by setting the threshold as "1" which is smaller than the threshold "3" for the video data having a great image size. Generally, when the image size is great, the data amount is increased and the processing load for decoding is increased. It is possible to reduce the processing load on the decoding, by making the omission of the decoding having a high processing load easier. In contrast, it is possible to decode the compressed image without omission, by setting the threshold as "3" for the video data having a small image size. When the image size is small, it is estimated that the data amount is small and the processing load required for decoding is low.

Modification Example

The embodiment described above may be modified in the following manner. It is possible to appropriately combine some configurations in the following modification examples for use. Even in cases of employing the following configuration, it is possible to achieve the same effect as that described above.

(1) In the above description, with respect to the number of sites which is acquired in S31 of the initial threshold setting process (see FIG. 5) and S61 of the threshold setting process (see FIG. 7) of Example 1, it is assumed that the server device 20 transmits the number obtained by subtracting "1" from the number of all communication devices which are connected to the server device 20 for conference at the requested time, as the number of sites, to the communication terminal device 30 as the request source. The server device 20 may transmit the number of all communication devices which are connected for conference in response to the request, and CPU 32 may subtract "1" from the number so as to calculate and acquire the number of sites. Further, the number of all communication devices which are connected for conference may be treated as the number of sites. In this case, the reference number that is compared with the number of sites in S33 of FIG. 5 is set to a value obtained by considering the device itself. In other words, based on the above description, the reference number in S33 of FIG. 5 is set to "6" which is obtained by adding "1" to "5".

Figure 5:
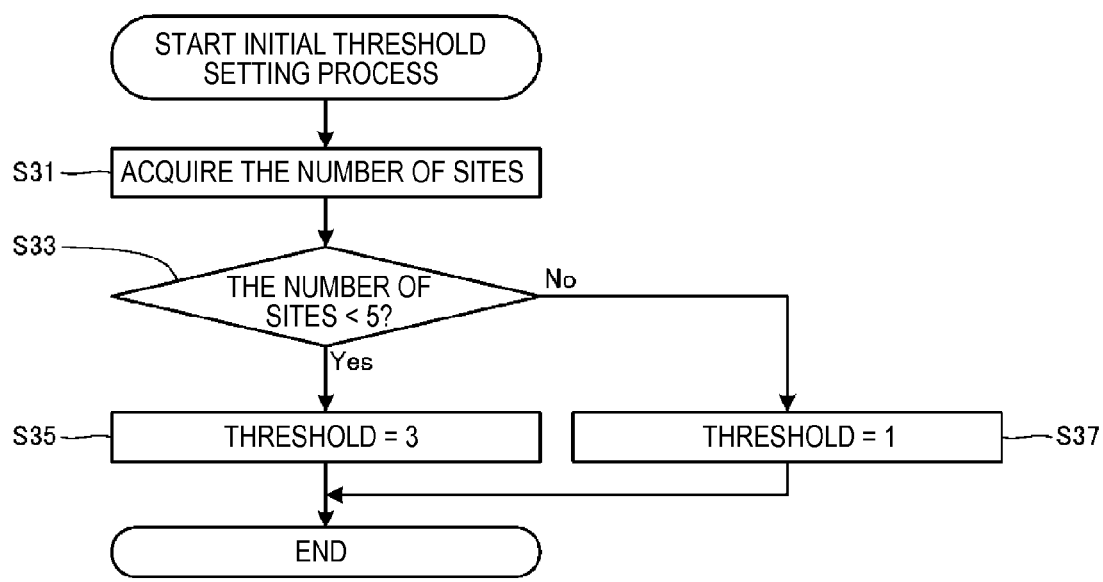
FIG. 5 is a flowchart of an initial threshold setting process.

In S33 of FIG. 5, when the number of sites is the same as the reference number, it is assumed that the determination is negative (S33: No). However, in S33, the determination may be made based on whether the number of sites is the reference number or less, and when the number of sites is the same as the reference number, it may be assumed that the determination is positive (S33: Yes).

(2) In the above description, it is assumed that the threshold is set as "3" in S35 of the initial threshold setting process (see FIG. 5), and the threshold is set as "1" in S37. The respective values which are set as the thresholds in S35 and S37 may be set as values which are different from the above values. However, the respective values in S35 and S37 have the same magnitude relationship as that described above. The respective values which are set as thresholds in S85, S89, and S91 of the threshold setting process (see FIG. 8) of Example 2, and in S105 and S107 of the threshold setting process (see FIG. 9) of Example 3 may be set as values which are different from the above values, as long as the same magnitude relationship as that described above is satisfied. The threshold in each process described above is appropriately set considering the processing capability of the CPU 32.

In the threshold setting process (see FIG. 7) of Example 1, it is assumed that the site change amount (see S67 in FIG. 7) is subtracted from or the absolute value of the site change amount (see S71 in FIG. 7) is added to the threshold which has been set. The values applied for the thresholds which have been set in S67 and S71 of FIG. 7 may be, for example, a predetermined value or a certain fixed value corresponding to the site change amount. The values applied for the threshold are set appropriately considering various conditions.

(3) In the above description, in S47 of the decoding process (see FIG. 6), when the number of unprocessed images is the same as the threshold, it is assumed that the determination is negative (S47: No). However, in S47, the determination may be made based on whether the number of unprocessed images is the threshold or less, and when the number of unprocessed images is the same as the threshold, it may be assumed that the determination is positive (S47: Yes).

It is assumed that in S53 of FIG. 6, the determination is based on whether the compressed image is an I frame. In S53, the determination may be made based on whether the compressed image is an I frame or a P frame. When the compressed image is the I frame or the P frame, S53 is positive (S53: Yes), the I frame or the P frame is decoded in S55. On the contrary, when the compressed image is the B frame, S53 is negative (S53: No), the decoding for the B frame is omitted in S55. While reducing the processing load on the decoding by excluding the B frame from a decoding target, it is possible to suppress a decrease in the reproduction quality of the captured images 381, 382, 383, and 384 by using the I frame and the P frame as the decoding target. In addition, in S53, the determination may be made based on whether the compressed image is the I frame or the B frame.

(4) In the above description, in S61 of the threshold setting process (see FIG. 7) of Example 1, it is assumed that the request form the number of sites is transmitted, and the number of sites is received and acquired from the server device 20. The CPU 32 may acquire the number of sites, based on the number of pieces of video data that the CPU 32 can acquire at the timing of S61, among respective pieces of video data from the counter party devices 71, 72, 73, and 74. In this case, the CPU 32 specifies the number of pieces of video data that the CPU 32 can acquire at the timing of S61. The CPU 32 treats the specified number as the number of sites. It is possible to acquire the number of sites without through the server device 20.

(5) In the above description, it is assumed that the image size as the reference of determination is a VGA in S103 of the threshold setting process (see FIG. 9) of Example 3. The image size as the reference may be a size different from the VGA. For example, the image size may be a QVGA (horizontal×vertical 320×240 pixels), a display area of the display unit 38, or the size of a teleconference screen. The image size as the reference is appropriately set considering the processing capability of the CPU 32. It may be assumed that the image size as the reference is selectable, and the image size can be changed into the size designated by the user. The user operates the operation unit 40 so as to select a certain size as the image size which is the reference. The CPU 32 sets the image size based on the selection as the image size which is the reference.

Figure 9:
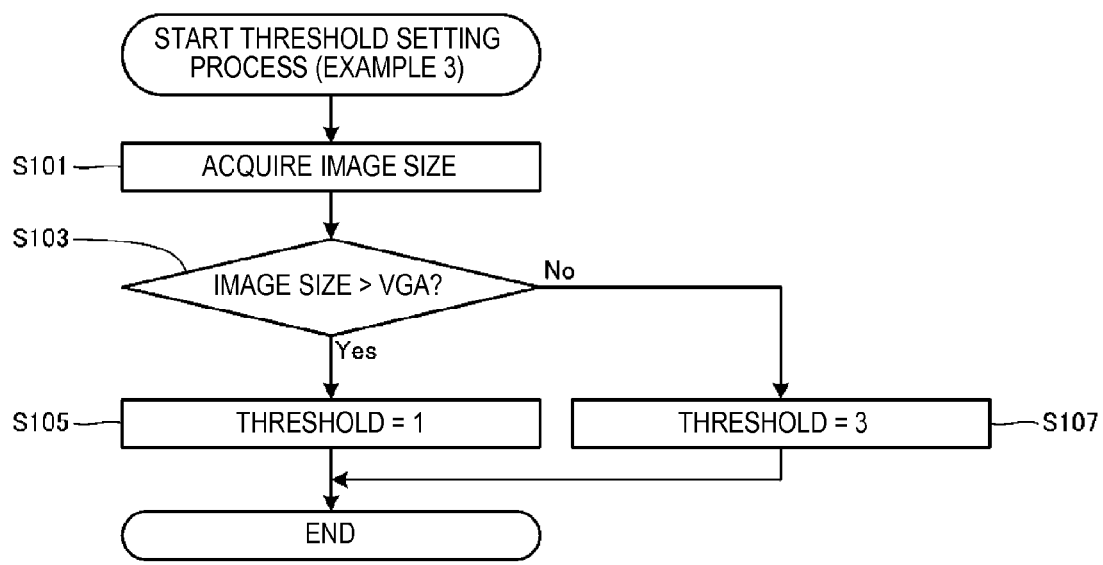
FIG. 9 is a flowchart of a threshold setting process of Example 3.

In S103 of FIG. 9, it is assumed that when the image size is VGA, the determination is negative (S47: No). In S47, determination is made based on whether the image size is the VGA or less, and when the image size is the VGA, the determination may be positive (S103: Yes).

What is claimed is:

1. A non-transitory computer readable recording medium storing a computer-executable program, when executed by a computer of a communication terminal device used in a teleconference through a network, causing the communication terminal device to execute:
- a first acquisition instruction of acquiring, through a communication unit of the communication terminal connected to the network, video data including a compressed image from counter party devices including at least a first counter party device and a second counter party device, the first counter party device and the second counter party device being counter partied of the teleconference;
- a storage control instruction of sequentially storing the compressed image included in the acquired video data in a storage area according to an order in which the compressed images have been acquired;
- a first determination instruction of determining whether a number of unprocessed compressed images is greater than a threshold, the unprocessed compressed images being the compressed images which are stored in the storage area and have not been subjected to a decoding process;
- a second determination instruction of second determining whether an image type of the compressed image is a predetermined type;
- a decoding control instruction of:
  - decoding the compressed image when the first determination instruction determines that the number of the unprocessed compressed images is not greater than the threshold and when the second determination instruction determines that the image type of the compressed image is the predetermined type; and
  - not decoding the compressed image when the first determination instruction determines that the number of the unprocessed compressed images is greater than the threshold and when the second determination instruction determines that the image type of the compressed image is not the predetermined type;
- a second acquisition instruction of acquiring the number of the counter party devices which communicate with the communication terminal device; and
- a setting instruction of:
  - setting the threshold to a first value, when the number of the counter party devices acquired by the second acquisition instruction is smaller than a reference number which is a reference; and
  - setting the threshold to a second value which is smaller than the first value, when the number of the counter party devices acquired by the second acquisition instruction is greater than the reference number.

2. The non-transitory computer readable recording medium according to claim 1,
wherein when the first determination instruction determines that the number of the unprocessed compressed images is greater than the threshold, the second determination instruction determines whether the image type of the compressed image is the predetermined type, and
wherein when the first determination instruction determines that the number of the unprocessed compressed images is not greater than the threshold, the second determined instruction does not determine whether the image type of the compressed image is the predetermined type.

3. The non-transitory computer readable recording medium according to claim 1, wherein the compressed images of the video data include intra-frame compressed data and inter-frame compressed data.

4. The non-transitory computer readable recording medium according to claim 3, wherein the predetermined type is related to the intra-frame compressed data and the inter-frame compressed data.

5. The non-transitory computer readable recording medium according to claim 3, wherein the decoding control instruction includes an instruction of:
- decoding the compressed image acquired from the storage area, when the image type of the compressed image is an intra-frame compressed image,
- not decoding the compressed image acquired from the storage area, when the image type of the compressed image is an inter-frame compressed image.

6. The non-transitory computer readable recording medium according to claim 3, wherein the decoding control instruction includes an instruction of:
- decoding the compressed image acquired from the storage area, when the image type of the compressed image is an intra-frame compressed image;
- decoding the compressed image acquired from the storage area, when the image type of the compressed image is a first type inter-frame compressed image; and
- not decoding the compressed image acquired from the storage area, when the image type of the compressed image is a second type inter-frame compressed image.

7. The non-transitory computer readable recording medium according to claim 6, wherein the first type inter-frame compressed image is of a predicted frame and the second type inter-frame compressed image is of a bi-directional predicted frame.

8. The non-transitory computer readable recording medium according to claim 1, wherein the program causes the communication terminal device to execute:
- a third acquisition instruction of acquiring a new compressed image from the storage area, when the decoding control instruction determines not to decode the compressed image acquired from the storage area.

9. The non-transitory computer readable recording medium according to claim 1,
wherein the second acquisition instruction includes an instruction of acquiring the number of the counter party devices and re-acquiring a new number of the counter party devices in a state in which the threshold which is the first value or the second value is set,
wherein the program causes the computer to execute as a second comparison instruction of comparing the new number of the counter party devices with the number of the counter party devices acquired by the second acquisition instruction before the new number of the counter party devices is acquired, when the new number of the counter party devices is re-acquired by the second acquisition instruction, and
wherein the setting instruction includes an instruction of:
- reducing the threshold that has been set, when the new number of the counter party devices is greater than the number of the counter party devices acquired by the second acquisition instruction before the new number of the counter party devices is acquired; and
- increasing the threshold that has been set, when the new number of the counter party devices is smaller than the number of the counter party devices acquired by the second acquisition instruction before the new number of the counter party devices is acquired.

10. The non-transitory computer readable recording medium according to claim 1, wherein the video data includes first video data acquired from the first counter party device and second video data acquired from the second counter party device, the first video data includes a first compressed image and the second video data includes a second compressed image, the storage area includes a first storage area and a second storage area, the storage control instruction includes an instruction of sequentially storing the first compressed image included in the acquired first video data in the first storage area according to an order in which the first compressed images have been acquired and sequentially storing the second compressed image included in the acquired second video data in the second storage area according to an order in which the second compressed images have been acquired;

the first determination instruction includes an instruction of:
 determining whether a number of first unprocessed compressed images is greater than a first threshold, the first unprocessed compressed images being the first compressed images which are stored in the first storage area and have not been subjected to the decoding process, and
 determining whether a number of second unprocessed compressed images is greater than a second threshold, the second unprocessed compressed images being the second compressed images which are stored in the second storage area and have not been subjected to the decoding process;

the second determination instruction includes an instruction of determining whether an image type of the first compressed image is the predetermined type and whether an image type of the second compressed image is the predetermined type;

the decoding control instruction includes an instruction of:
 decoding the first compressed image when the second determination instruction determines that the number of the first unprocessed compressed images is not greater than the first threshold and when the second determination instruction determines that the image type of the first compressed image is the predetermined type,
 decoding the second compressed image when the second determination instruction determines that the number of the second unprocessed compressed images is not greater than the second threshold and when the second determination instruction determines that the image type of the second compressed image is the predetermined type; and
 not decoding the first compressed image when the second determination instruction determines that the number of the first unprocessed compressed images is greater than the first threshold and when the second determination instruction determines that the image type of the first compressed image is not the predetermined type, and
 not decoding the second compressed image when the second determination instruction determines that the number of the second unprocessed compressed images is greater than the second threshold and when the second determination instruction determines that the image type of the second compressed image is not the predetermined type.

11. The non-transitory computer readable recording medium according to claim 10, wherein the program causes the communication terminal device to execute a setting instruction of:
 setting a predetermined value as the first threshold to be compared with the number of first unprocessed compressed images; and
 setting a value which is the same as or different from the predetermined value as the second threshold to be compared with the number of second unprocessed compressed images.

12. The non-transitory computer readable recording medium according to claim 11, wherein the setting instruction includes an instruction of:
 setting a third value as the first threshold to be compared with the number of first unprocessed compressed images, when authority which is set to the first counter party device indicates a degree of a function executable in the teleconference is a first authority;
 setting a fourth value which is greater than the third value as the first threshold to be compared with the number of first unprocessed compressed images, when the authority which is set to the first counter party device is a second authority which is higher than the first authority;
 setting the third value as the second threshold to be compared with the number of second unprocessed compressed images, when the authority which is set to the second counter party device is the first authority; and
 setting the fourth value as the second threshold to be compared with the number of second unprocessed compressed images, when the authority which is set to the second counter party device is the second authority.

13. The non-transitory computer readable recording medium according to claim 11, wherein the setting instruction includes a function of:
 setting a predetermined value according to an image size of the first video data as the first threshold to be compared with the number of first unprocessed compressed images; and
 setting a value which is the same as or different from the predetermined value according to an image size of the second video data as the second threshold to be compared with the number of second unprocessed compressed images.

14. The non-transitory computer readable recording medium according to claim 13, wherein the setting instruction includes an instruction of:
 setting a fifth value as the first threshold to be compared with the number of first unprocessed compressed images, when the image size of the first video data is a first size;
 setting a sixth value smaller than the fifth value as the second threshold to be compared with the number of second unprocessed compressed images, when the image size of the first video data is a second size greater than the first size;
 setting the fifth value as the second threshold to be compared with the number of second unprocessed compressed images, when the image size of the second video data is the first size; and
 setting the sixth value as the second threshold to be compared with the number of second unprocessed compressed images, when the image size of the second video data is the second size.

15. The non-transitory computer readable recording medium according to claim 1, wherein the unprocessed compressed images are stored in the storage area after the compressed image is stored in the storage area.

16. A non-transitory computer readable recording medium storing a computer-executable program, when executed by a computer of a communication terminal device used in a teleconference through a network, causing the communication terminal device to execute:
- a first acquisition instruction of acquiring, through a communication unit of the communication terminal connected to the network, video data including a compressed image from counter party devices including at least a first counter party device and a second counter party device, the first counter party device and second counter party device being counter partied of the teleconference;
- a storage control instruction of sequentially storing a compressed image included in the acquired video data in a storage area according to an order in which the compressed images have been acquired;
- setting a first value as a threshold when authority, which is set to the first counter party device and indicates a degree of a function executable in the teleconference, is a first authority;
- setting a second value greater than the first value as a threshold when the authority, which is set to the first counter party device, is a second authority which is higher than the first authority;
- a first determination instruction of determining whether a number of unprocessed compressed images is greater than the threshold, the unprocessed compressed images being the compressed images which are stored in the storage area and have not been subjected to a decoding process;
- a second determination instruction of second determining whether an image type of the compressed image is a predetermined type; and
- a decoding control instruction of:
  - decoding the compressed image when the first determination instruction determines that the number of the unprocessed compressed images is not greater than the threshold and when the second determination instruction determines that the image type of the compressed image is the predetermined type; and
  - not decoding the compressed image when the first determination instruction determines that the number of the unprocessed compressed images is greater than the threshold and when the second determination instruction determines that the image type of the compressed image is not the predetermined type.

17. A non-transitory computer readable recording medium storing a computer-executable program, when executed by a computer of a communication terminal device used in a teleconference through a network, causing the communication terminal device to execute:
- a first acquisition instruction of acquiring, through a communication unit of the communication terminal connected to a network, video data including a compressed image from counter party devices including at least a first counter party device and a second counter party device, the first counter party device and the second counter party device being counter partied of the teleconference;
- a storage control instruction of sequentially storing the compressed image included in the acquired video data in a storage area according to an order in which the compressed images have been acquired;
- setting, as a threshold, a predetermined value according to an image size of the video data;
- a first determination instruction of determining whether a number of unprocessed compressed images is greater than the threshold, the unprocessed compressed images being the compressed images which are stored in the storage area and have not been subjected to a decoding process;
- a second determination instruction of second determining whether an image type of the compressed image is a predetermined type; and
- a decoding control instruction of:
  - decoding the compressed image when the first determination instruction determines that the number of the unprocessed compressed images is not greater than the threshold and when the second determination instruction determines that the image type of the compressed image is the predetermined type; and
  - not decoding the compressed image when the first determination instruction determines that the number of the unprocessed compressed images is greater than the threshold and when the second determination instruction determines that the image type of the compressed image is not the predetermined type.

* * * * *